Sept. 9, 1969   P. W. MIESSLER, SR   3,465,636
SEPARABLE FASTENER
Filed Feb. 15, 1968

INVENTOR
PAUL W. MIESSLER, SR.

BY
Finnegan, Henderson & Farabow
ATTORNEYS 3,465,636
SEPARABLE FASTENER
Paul W. Miessler, Sr., Berea, Ohio, assignor to The Flintkote Company, New York, N.Y., a corporation of Massachusetts
Filed Feb. 15, 1968, Ser. No. 705,757
Int. Cl. F16b *19/04*
U.S. Cl. 85—37                                   1 Claim

ABSTRACT OF THE DISCLOSURE

A separable fastener is provided for locking together adjoining panels of a fibreboard structure in assembled relationship. The fastener is formed from a blank of foldable material and includes a rectangular center section and two pairs of flaps that extend downwardly from the sides and beyond the ends of the fastener center section. The fastener is folded and inserted through a pair of aligned openings in the adjoining panels and then unfolded to lock the panels in assembled relationship.

---

This invention relates to a fastening device, and more particularly to a separable fastener of foldable material for locking together adjoining panels of a fiberboard structure in assembled relationship.

In the construction of fiberboard shipping containers, boxes, cartons, display stands, toy buildings, or the like, various fastening devices have been used for holding together individual panels of the fiberboard structure. A conventional type of fastening device that has long been used comprises a T-shaped locking tab on one panel of the structure and a narrow slot in another panel of the structure for receiving the tab in locking relationship.

These locking tabs, however, must be distorted as they are engaged in locking position, and such distortion can weaken or tear the tabs and destroy their effectiveness as a strong fastening device. Further, such tabs can easily be torn as they are disengaged from a locking position, and, thus, reassembly and further use of the structure after it has once been disassembled may be prevented.

Another type of fastening device that has also been used with fiberboard structures is a separable fastener that permits quick and easy assembly and disassembly of the structure without damage to the fastener or the structure.

Exemplary of a prior art separable fastener is a blank of foldable material having a flat center section and a pair of flaps that extend downwardly from the sides and beyond one end of the center section. In assembly, the fastener flaps are pushed through a pair of aligned openings in adjacent panels of the structure and the fastener is then rotated in a scooping motion to a fastening position.

In this position, the flaps that extend beyond one end of the center section engage the underside of one of the adjoining panels while the center section engages the top side of the other panel to hold the two panels together in assembled relationship. Such a fastener can be easily engaged and disengaged without damage to the fastener or the structure, thereby permitting quick and easy assembly and disassembly of the structure, if desired.

This prior art separable fastener, however, does not lock the panels of the structure in assembled relationship and has a tendency to work loose during normal handling of the structure. Such a fastener, therefore, is not ideal for use in the construction of fiberboard structures, especially where any degree of handling or movement of the structure can be expected.

It is, therefore, desirable to provide a fastening device that locks the individual panels of a fiberboard structure together in assembled relationship, that can be quickly and easily engaged into its locking position, and that can be quickly and easily disengaged from its locking position, if desired, without damage to the fastener or the structure.

Accordingly, it is a primary object of this invention to provide a new and improved fastening device for holding together two or more adjoining panels in assembled and locked relationship.

Another object of this invention is to provide a new, improved, and inexpensive separable fastener of foldable, fiberboard material for holding together adjoining panels of a fiberboard structure in assembled relationship.

Still another object of this invention is to provide a separable fastener for locking together adjoining panels of a fiberboard structure in assembled relationship in which the fastener can be quickly and easily engaged into its locking position and quickly and easily disengaged from its locking position without damage to the fastener or the structure.

Yet another object of this invention is to provide a separable fastener for locking together adjoining panels of a fiberboard structure and in which the fastener includes a center section that engages the top side of one of a pair of adjoining panels and two pairs of locking flaps on both ends of the fastener that extend through a pair of aligned openings in the adjoining panels and engage the bottom side of the other of the pair of adjoining panels to lock the panels together in assembled relationship.

Additional objects and advantages will be set forth in part in the description which follows and in part will be obvious from the description, or may be learned by practice of the invention, the objects and advantages being realized and attained by means of the mechanisms, instrumentalities, and combinations particularly pointed out in the appended claims.

To achieve the foregoing objects and in accordance with its purpose, this invention as embodied and broadly described provides a separable fastener for locking together adjoining panels of a structure in assembled relationship. Each panel is provided with a pair of parallel slots that are aligned with one another when the structure is assembled and the fastener is formed from a blank of foldable material.

The fastener comprises a rectangular section having sides and ends and width approximately equal to the width of the pair of openings in the panels. The fastener further comprises four flaps foldably connected to and extending along a portion of the length of each side of the rectangular section between an end and the midpoint of the section. An opening is provided between the flaps on each side of the section so that the rectangular section can be folded near its midpoint. Each flaps has a locking edge that extends beyond the ends of the rectangular section and is parallel to and spaced from the sides of the rectangular section a distance approximately equal to the combined thickness of the adjoining panels.

In assembly, the rectangular section is folded at its midpoint and each flap is folded downwardly and inserted through the aligned openings in the panels. The rectangular section is then unfolded to engage that section against the top of the uppermost panel while the locking edges of the flaps engage the bottom of the lowermost panel adjacent both ends of the openings to lock the adjoining panels in assembled relationship.

The accompanying drawings which are incorporated in and constitute a part of the specification illustrate one embodiment of the invention and, together with the description, serve to explain the principles of the invention.

It is to be understood that both the foregoing general description and the following detailed description are exemplary and explanatory but are not restrictive of the invention.

Reference will now be made in detail to the present preferred embodiment of the invention, an example of which is illustrated in the accompanying drawings.

Figure 1:
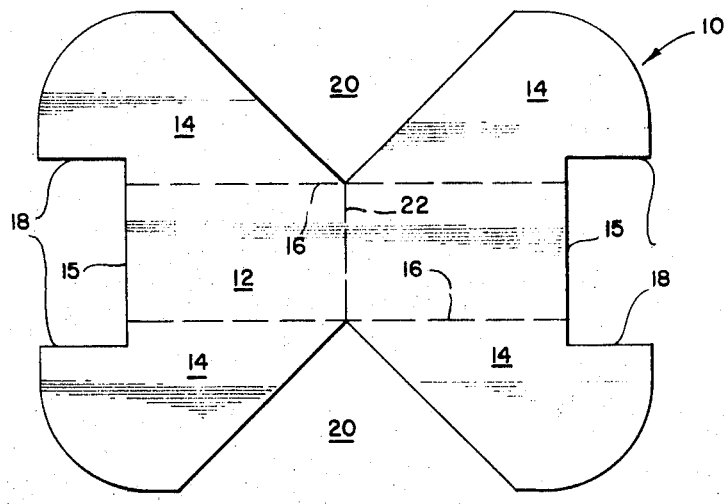
FIG. 1 is a plan view of a blank of foldable material forming the separable fastener of this invention for locking together adjoining panels of a fiberboard structure in assembled relationship.

As shown in FIG. 1, the separable fastener of this invention is formed from a blank of foldable material generally indicated as 10. The fastener includes a rectangular section 12, having ends 15 and sides 16, and four flaps 14 that are foldably connected to sides 16 of rectangular section 12. The fastening device may be of any suitable foldable material, such as paperboard, cardboard, fiberboard, or the like, but preferably is constructed of corrugated container board which exhibits lightness and strength.

Each flap 14 has a locking edge 18 that extends beyond an end 15 of rectangular section 12 and is parallel to and spaced from sides 16 of rectangular section 12, a distance approximately equal to the combined thickness of the adjoining panels. A wedge-shaped opening 20 is provided between flaps 14 on each side of rectangular section 12 to permit folding of the rectangular section along crease line 22.

Figure 2:
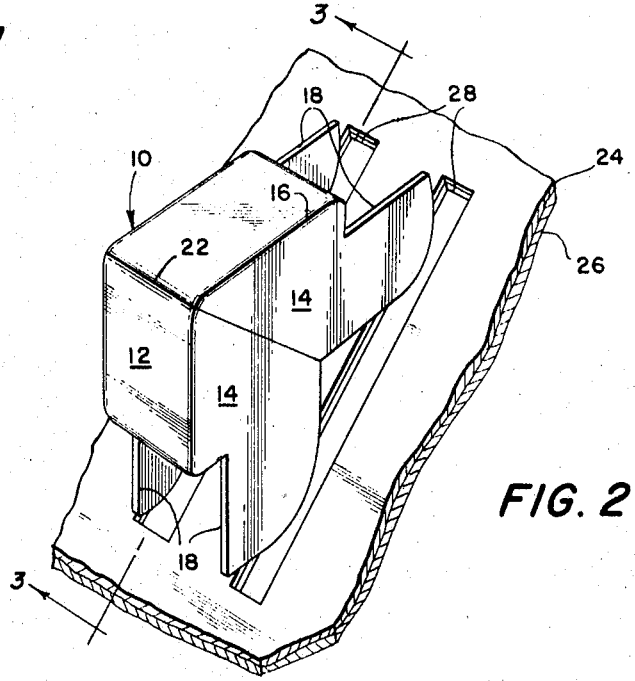
FIG. 2 is a perspective view of the fastener in a folded position and shows the relative position of the fastener and the panels prior to assembly.

As shown in FIG. 2, in a fiberboard structure, adjoining panels 24 and 26, which are to be held together by the fastener of this invention, include a pair of parallel slots 28 having a length substantially equal to the length of rectangular section 12 in an unfolded position.

Prior to assembly of the structure, fastener blank 10 is folded along crease lines 16 so that each flap 14 is substantially normal to rectangular section 12, and along crease line 22 so that the fastener is in the form shown in FIG. 2.

Figure 3:
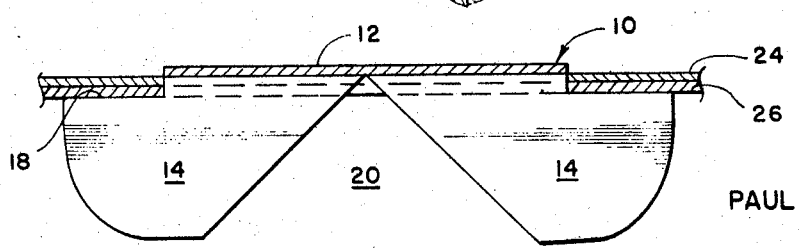
FIG. 3 is a sectional view taken along the line 3—3 of FIG. 2 and shows the fastener in a locking position.

In assembly, slots 28 in adjoining panels 24 and 26 are brought into alignment, and flaps 14 are then inserted through these slots as shown in FIG. 2. After inserting flaps 14, rectangular section 12 is pushed flat and unfolded along crease line 22 until fastener is in locking position as shown in FIG. 3.

In locking position, rectangular section 12 engages the top of upper panel 24 between slots 28 while the locking edge 18 of each flaps 14 engages the bottom of lower panel 26 adjacent one of the ends of slots 28 to lock the panels together in assembled relationship.

It can be seen, therefore, that the fastening device of this invention is quickly and easily engaged in locking position and securely holds the adjoining panels in assembled relationship by locking the panels between rectangular section 12 and flaps 14 at both ends of slots 28. Further, it can be seen that a neat appearance is provided on the outer surface of the structure, since rectangular section 12 is substantially flush with the outer surface of panel 24 and flaps 14 extend into the inner portions of the structure.

To disassemble the structure, fastener 10 is merely pulled back to the position shown in FIG. 2 and removed through slots 28 without damage to the fastener or the structure, thus permitting reuse of the fastener and reassembly of the structure, if desired.

It will be understood that while a preferred construction for the fastening device has been described, the particular shape may be varied. For example, tabs may be provided on either or both ends of rectangular section 12, which comprises that portion bounded by sides 16 and ends 15, without affecting the operation of the fastener of this invention. Further, a rectangular opening may be provided between flaps 14 instead of wedge-shaped opening 20 to permit folding of the fastener along crease line 22.

The invention thus provides new, improved, and lightweight separable fasteners for fiberboard structure that are highly economical to manufacture and that can be quickly and easily engaged in locking position to securely hold a plurality of adjoining panels to such structures in assembled relationship. Further, the fasteners can be quickly and easily disengaged without damage to the fasteners or to the structures, thereby permitting disassembly and reassembly of the structures using the same fasteners.

The invention in its broader aspects is not limited to the specific details shown and described and departures may be made from such details without departing from the principles of the invention and without sacrificing its chief advantages.

What is claimed is:

1. A separable fastener for holding together in surface contact adjoining panels of a structure, each panel having a pair of registrable parallel slots, said fastener being readily engaged to hold the panels together and readily disengaged and removed to permit disassembly of the structure and reuse of the fastener, the fastener being formed from a blank of foldable material and comprising:

(a) a rectangular section for overlying the top of the uppermost panel, said rectangular section having side edges and a width approximately equal to the width of the pair of slots, free ends and a length, approximately equal to the length of the pair of slots, and being folded midway between its ends;

(b) four flaps foldably connected to and extending perpendicularly and downwardly from a portion of the length of each side edge of the rectangular section between one of its ends and the midpoint of the section, and extending perpendicularly beyond the ends of the rectangular section;

(c) an opening between the flaps on each side of the rectangular section to permit folding of the rectangular section inwardly midway between its ends, said flaps being insertable through said slots when the rectangular section is folded inwardly midway between its ends; and (d) a locking edge on the top of that portion of each flap extending beyond the ends of the rectangular section, each of said locking edges being parallel with and spaced below the side edges of the rectangular section a distance sufficient to accommodate the combined thickness of the adjoining panels, and engaging the bottom of the lowermost panel adjacent one of the slots when the rectangular section is unfolded and overlies the top of the uppermost panel to hold the panels in assembled relationship.

References Cited

UNITED STATES PATENTS 2,681,487 6/1954 Poupitch.
2,821,761 2/1958 Meyers.

EDWARD C. ALLEN, Primary Examiner